(12) United States Patent
David et al.

(10) Patent No.: US 11,266,059 B2
(45) Date of Patent: Mar. 8, 2022

(54) SEED TREATMENT METHOD (71) Applicant: RHODIA OPERATIONS, Paris (FR)

(72) Inventors: Chenglu David, Paris (FR); Patrick Ferlin, Paris (FR); Carole Lechartier, Colombes (FR); Patrick Phelippeau, Conflans Sainte Honorine (FR)

(73) Assignee: RHODIA OPERATIONS, Aubervilliers (FR)

( * ) Notice: Subject to any disclaimer, the term of this patent is extended or adjusted under 35 U.S.C. 154(b) by 567 days.

(21) Appl. No.: 15/778,733

(22) PCT Filed: Nov. 22, 2016

(86) PCT No.: PCT/EP2016/078420
§ 371 (c)(1),
(2) Date: May 24, 2018

(87) PCT Pub. No.: WO2017/089342
PCT Pub. Date: Jun. 1, 2017

(65) Prior Publication Data
US 2018/0352720 A1 Dec. 13, 2018

(30) Foreign Application Priority Data

Nov. 24, 2015 (FR) ..................................... 1561306

(51) Int. Cl.
| | | |
|---|---|---|
| *A01C 1/00* | (2006.01) | |
| *A01C 1/06* | (2006.01) | |
| *B01F 7/16* | (2006.01) | |
| *B01F 15/02* | (2006.01) | |
| *B01F 3/12* | (2006.01) | |

(52) U.S. Cl.
CPC .............. *A01C 1/06* (2013.01); *B01F 3/1207* (2013.01); *B01F 7/16* (2013.01); *B01F 15/028* (2013.01); *B01F 15/0258* (2013.01); *A01C 1/00* (2013.01); *B01F 2003/125* (2013.01)

(58) Field of Classification Search
CPC .................................... A01C 1/00; A01C 1/06
USPC ............................................ 47/57.6, 58.1 SE
See application file for complete search history.

(56) References Cited

U.S. PATENT DOCUMENTS

| | | | | |
|---|---|---|---|---|
| 3,960,292 | A * | 6/1976 | Knapp .................... | A01C 1/06 221/211 |
| 4,249,343 | A * | 2/1981 | Dannelly ................. | A23B 9/14 47/57.6 |
| 4,356,934 | A * | 11/1982 | Knake ...................... | A01C 1/06 111/174 |
| 4,955,723 | A | 9/1990 | Schneider | |
| 5,080,925 | A * | 1/1992 | Kouno .................... | B01J 13/08 264/5 |
| 5,830,271 | A * | 11/1998 | Kohno ..................... | A01C 1/06 118/13 |
| 2006/0032120 | A1 * | 2/2006 | McPherson ............. | A01C 1/06 47/57.6 |
| 2006/0236604 | A1 * | 10/2006 | Hesse ...................... | A01C 1/06 47/57.6 |
| 2011/0195839 | A1 * | 8/2011 | Schlotterbeck ........ | A01N 25/00 504/100 |
| 2014/0269153 | A1 | 9/2014 | Wells | |

FOREIGN PATENT DOCUMENTS

| | | |
|---|---|---|
| EP | 0408360 A2 | 1/1991 |
| GB | 2025200 A | 1/1980 |

* cited by examiner

*Primary Examiner* — David J Parsley
(74) *Attorney, Agent, or Firm* — Osha Bergman Watanabe & Burton LLP (57) ABSTRACT

Provided is a seed treatment method, using a composition that may be obtained extemporaneously by mixing at least one powder substance and an aqueous medium. The seed treatment method may include producing the mixture in an automatic and cyclic manner, in at least one first vessel, by introducing into same first at least a portion of the aqueous medium and next the powder substance, the latter being sucked into the aqueous medium in the vessel by a vacuum created in the vessel, at least partially draining the content of the vessel, by at least one blast of compressed gas in the vessel, to a seed treatment device where the mixture may be brought into contact with the seeds.

14 Claims, 3 Drawing Sheets

SEED TREATMENT METHOD

TECHNICAL FIELD

The present invention relates to the treatment of seeds and more particularly, but not exclusively, to a process and a facility for preparing a mixture intended for treating, in particular coating, grains.

BACKGROUND

In the field of agriculture, it is known to treat seeds to be able to handle them more easily, improve the environment in which they will grow or their germination properties, or to protect them, for example with regard to pests, mold or climatic conditions or from deteriorating while aging. To do this, various treatment processes exist, such as seed dressing, seed coating or seed pelletizing.

Seed coating generally consists in depositing, at the seed surface, a fine filmcoating of polymer in which various agrochemical substances are included. The shape and the size of the seeds during this process are only slightly modified.

Seed pelletizing consists in general in modifying the size and the shape of the seeds through considerable introduction of inert material, for example in order to facilitate the use of conventional mechanical seed drills which are difficult to use with seeds that are too small. Several phytosanitary substances may thus be more accurately localized in the various strata of the coating.

The term "coating" will subsequently denote "seed coating" or "pelletizing".

Conventionally, the treatment formulations used are:

liquid formulations typically comprising a fungicide as a dispersion in water, pigments and binder polymers, or powder formulations, making it possible to accelerate drying, reduce adhesiveness and improve flowability of the grains.

Typically, the liquid formulations are applied to the seeds by means of processes such as spraying, spray-drying, blending, churning, or any other means well known to those skilled in the art.

In the case of powder formulations, the adhesion of the formulation to the seeds is carried out by addition of water, as is described in patent application GB 2 025 200.

More specifically, the method most commonly used consists in premixing the powder and the water so as to obtain a dispersion, which is itself then applied to the seeds. Alternatively, the following procedure may be carried out: either the seeds are wetted and the powder is then added to the seeds, or the powder is mixed with the seeds and then the water is added.

However, some treatment compounds remain difficult to apply to seeds. This is in particular the case with hydratable compounds which develop high viscosity on contact with water and which it is desired to use in a large bulk proportion. Typically, on large crop seeds, the proportion targeted is between 0.1% and 1%, this proportion corresponding to the weight of the treatment formulation in dry weight, after elimination of the water, to the weight of seed.

In the case of a liquid formulation, these hydratable compounds cause a viscosity that is too high for it to be possible to handle and apply the formulation under usual conditions. Moreover, the option consisting in diluting the formulation (in order to reduce the concentration of the compound and thus to limit the viscosity of the formulation) is not satisfactory. This is because this option would result in a large amount of water being introduced relative to the weight of seeds treated. In point of fact, the amount of water is limited by a maximum value acceptable by the seeds in the absence of drying, which is the rule for large crop seeds. Beyond this acceptable threshold, the seed may spontaneously germinate on storage or quickly lose its germination capability after some time in storage, or the water may cause swelling of the grain, which only regains its initial shape very slowly, these variations in volume possibly leading to crumbling, or even cracking of the seed pelletizing or seed coating film, or else causing agglomerates of treated seeds. The option consisting in diluting the formulation will therefore be satisfactory only on the condition of using the seeds just after the treatment, which is not envisionable for large crop seeds because these seeds represent large volumes.

In the case of a powder formulation, it has been possible to note that the abovementioned hydratable compounds produce seed treatment inhomogeneity problems, and residues which in turn cause problems of loss of material and of fouling of mixing equipment.

It has been possible to propose various facilities which make it possible to disperse a powder in a liquid medium.

US 2014/0269153 describes an industrial facility for carrying out mixing, in which a powder is introduced into a mixing tank by means of a negative pressure.

EP 1 165 874 thus discloses a facility in which a powder is introduced into a mixing tank via a dip tube. Such a facility is not however suitable for the preparation of a composition based on hydratable compound(s), given its rheological behavior. In particular, the use of hydratable compounds would pose a problem of rapid fouling of the dip tube and of deposition, on the walls of the tank, of residues that are difficult to remove.

Publications CN 202105636, CN 203329707, CN104607091 and CN201880505 describe other facilities that are also unsuitable for the automatic preparation of several successive batches of mixture, with a relatively low variability of the formulation of the mixture between batches.

There is therefore a need for a new treatment process which makes it possible to apply to seeds, in an automated and cyclic manner, pulverulent substances, in particular hydratable compounds, in a significant proportion.

There is also a need for a facility for carrying out such a process on the industrial scale and at a reasonable cost.

There is also a need for a facility which makes it possible to carry out, in a combined manner, by means of one and the same facility, various types of seed treatments.

There is also a need for a new seed treatment process, and a facility for carrying out such a process, that may be integrated into an industrial seed treatment line without significantly impacting on the bulkiness and/or the rate thereof (typically of at least 20 kg of seeds treated per minute, in particular of at least 100 kg of seeds treated per minute, in particular of at least 150 kg of seeds treated per minute, in particular of at least 200 kg of seeds treated per minute, or even of at least 300 kg of seeds treated per minute).

GENERAL PRESENTATION

The invention corresponds to all or some of the abovementioned needs, by virtue of a seed treatment process, using a composition obtained extemporaneously by mixing at least one pulverulent substance and an aqueous medium, comprising the steps consisting in:

automatically and cyclically carrying out the mixing in at least a first tank by introducing into said tank first at least one portion of the aqueous medium and then the pulverulent substance, the latter being sucked into the aqueous medium in the tank by virtue of a negative pressure created in the tank, at least partially emptying its content to a seed treatment device where the mixture is brought into contact with the seeds, said emptying being carried out by means of at least one blast of a compressed gas in the tank.

The invention allows automated operation over several treatment cycles, while advantageously limiting the problems therein of fouling of the tank that are associated with the rheological behavior of the dispersion, in particular in the case where the pulverulent substance is a hydratable compound.

The injection of the pulverulent substance into the liquid in the tank by means of a negative pressure proves to limit the emission of dust and the depositing of the pulverulent substance on the emerging walls of the tank, while at the same time ensuring good dispersion of the pulverulent substance in the liquid.

The invention is thus particularly suitable for a pulverulent substance that is a hydratable compound.

The invention is in particular suitable for a mixture which has a viscosity that increases significantly over time.

The volume of the mixture in the tank is preferably less than or equal to 15 l, better still less than or equal to 10 l, it preferably being at least 0.1 l, in particular at least 0.5 l. Such a volume is very suitable for seed treatment, and makes it possible to use a tank of standard manufacture, without particular reinforcement of its mechanical strength, which would not be the case with a tank of larger size, given the pressure or negative pressure levels encountered. It should be noted that, surprisingly, despite this relatively small volume, the injection of the pulverulent substance may be carried out without soiling the tank or causing a high emission of dust, despite several repeated cycles without manual intervention inside the tank owing to the automation.

In examples of implementation of the invention, the process is devoid of any step of drying the mixture between the step of forming the mixture and the step of applying the latter to the seeds. Thus, the content of the tank applied to the seeds is other than a dry powder, being in particular in the form of an aqueous dispersion of the pulverulent material in the aqueous medium.

The content of the tank may be discharged by one or more blasts of compressed gas, preferably by a single blast of compressed gas.

The first blast may be carried out at the latest 60 s after the end of the introduction of the pulverulent substance into the tank, but still at the latest 30 s after said introduction, and the final blast may be carried out, where appropriate, at the latest 30 min after the end of the introduction of the pulverulent substance into the tank, better still at the latest 15 min after said introduction, even better still at the latest 5 min after said introduction and even better still at the latest 75 s after said introduction, or even at the latest 60 s after said introduction.

When the discharging of the contents of the tank is carried out by a single blast of compressed gas, said blast is preferably carried out at the latest 5 min after the end of the introduction of the pulverulent substance into the tank, better still at the latest 2 min, even better still at the latest 75 s after said introduction, preferably at the latest 45 s after said introduction, preferably at the latest 30 s after said introduction, for example at the latest 20 s after said introduction, or even at the latest 10 s after said introduction.

Such durations between the end of the introduction of the pulverulent substance and the discharging from the tank make it possible to be able to treat a large amount of seeds in a small amount of time. Furthermore, in the case of the application of an aqueous dispersion which changes rheologically over time, in particular becoming increasingly viscous over time, such a duration between the end of the introduction of the pulverulent substance and the discharging from the tank makes it possible to have an aqueous dispersion with an appropriate viscosity during its application to the seeds.

Preferably, the application of the content of the tank to the seeds is carried out immediately after the discharging of the content from the tank, preferably less than 5 min after the discharging, better still less than 1 min after said discharging, even better still less than 30 s after said discharging.

Preferably, the process is devoid of any step of storage of the content of the tank between the emptying of the latter and the application of the content of the tank to the seeds.

The injection of the pulverulent substance into the tank may be carried out through a tapping with an internal diameter of less than or equal to 17 mm, for example of between 3 and 17 mm, better still of between 5 and 15 mm. Such a diameter makes it possible to limit the dead volume and to reduce the risk of fouling.

The mixture may be subjected to stirring according to at least two different stirring conditions.

In particular, the mixture may be subjected to stirring according to a condition that is weaker (typically by a factor of 0.05 to 0.9, or even zero) at the time of the at least partial emptying, compared with the sequence going from the end of the introduction of the pulverulent substance to the beginning of the emptying. The risk of formation of gas pockets in the discharge pipe is thus reduced. The flow stress at the emptying tapping is thus also reduced.

According to one preferred embodiment, the stirring condition in the tank may be identical starting from the introduction of the pulverulent substance into the tank up until the beginning of the emptying.

According to this embodiment, the mixture may be subjected to stirring according to a condition that is weaker (typically by a factor of 0.05 to 0.9, or even zero) at the time of the at least partial emptying, compared with the sequence going from the beginning of the introduction of the pulverulent substance to the beginning of the emptying.

According to another embodiment, the mixture may be subjected to stirring according to at least two different non-zero stirring conditions starting from the introduction of the pulverulent substance into the tank up until the beginning of the emptying, including a condition that is stronger (typically by a factor of 1.1 to 4) between the end of the introduction of the pulverulent substance and the beginning of the emptying, than at the time of the introduction of the pulverulent substance into the tank. The risk of projection of pulverulent substance above the liquid in the tank during the step of introducing said substance is thus reduced.

By way of illustration, the mixture may be subjected to stirring ranging from 300 to 2000 rpm, for example from 400 to 1000 rpm, between the beginning of the introduction of the pulverulent substance and the beginning of the emptying, or even between the end of the introduction of the pulverulent substance and the beginning of the emptying.

The aqueous medium may contain at least one phytosanitary active agent the latter being injected into a water pipe connected to the tank. The aqueous medium may in particular contain several phytosanitary active agents injected separately by means of respective tappings into said pipe. Such a separate injection facilitates traceability and maintenance. It also significantly reduces the bulkiness in the immediate vicinity of the tank. The invention makes possible the separate injection of these various phytosanitary active agents into the pipe, their introduction into the tank possibly being, moreover, carried out either simultaneously or sequentially.

This pipe may comprise a direct line which opens out directly into the tank and at least one bypass which opens out into said tank by means of at least one washing head, and at least one valve for selectively sending the water optionally loaded with at least one phytosanitary active agent into the tank, either via the direct line or via the bypass.

In particular, the water may be sent into the tank via the direct line when it is loaded with the phytosanitary active agent(s). Excessive subjecting of the washing head to the phytosanitary active agent(s) is thus avoided, thereby reducing the risk of corrosion and also preventing any sedimentation of phytosanitary active agent(s) from resulting in gradual fouling of the washing head.

Preferably, a certain amount of water is sent into the tank once the latter has been emptied, this water circulating via the derivation and the washing head, and being used both for rinsing the tank and for forming the aqueous medium of the next preparation cycle. The amount of waste and the cost of treating the effluents generated by the facility are thus limited, since the rinsing water may be re-used as it is as early as the next preparation cycle. The experiment showed that even when proceeding in this manner, the variability with regard to the formulation of the mixture remains within acceptable limits given that the formation of this rinsing water is virtually constant from one cycle to the other.

The minimum level of negative pressure in the tank just before the suctioning of the pulverulent substance may be between −0.05 and −1 bar, in particular between −1 and −0.8 bar, better still between −0.3 and −0.5 bar. This minimum level of negative pressure is preferably maintained in the tank throughout the injection of the pulverulent substance.

The level of overpressure in the tank during the at least partial emptying operation may be between 0.05 and 2 bar, in particular between 0.1 and 1 bar. For example, the level of overpressure in the tank during the at least partial emptying operation may be less than or equal to 0.5 bar, for example between 0.1 and 0.5 bar.

The process according to the invention may comprise placing the tank at atmospheric pressure by means of a vent during the injection of water, optionally loaded with active agent(s), into the tank.

The content of the tank may be immediately automatically emptied to a dedicated container in the event of an emergency stop, this emergency emptying being in particular triggered by manually pushing a corresponding button.

The process according to the invention is advantageously carried out by means of at least two tanks according to cycles which are phase-shifted with respect to one another, these tanks preferably being connected to the same source of water and of active agent(s) and to the same source of pulverulent substance. According to this embodiment, each tank may be connected to the same seed treatment device or, alternatively, to distinct seed treatment devices. In other words, the emptying of each tank may be carried out either to one and the same seed treatment device, or to distinct seed treatment devices.

The invention also relates to a facility for preparing a seed treatment composition, in particular for carrying out the process according to the invention as defined above, said facility comprising at least one tank comprising:

- at least one tapping located below the level of the aqueous medium in the tank, where appropriate taking into account the vortex from stirring the aqueous medium, and connected to a pulverulent substance feed,
- one or more tappings connected to
  - a tank water feed pipe, this pipe itself comprising one or more tappings allowing injection of active agent (s) into said pipe,
  - a vent,
  - a vacuum source,
  - a compressed air source, and
- an outlet for emptying the tank to a treatment device where the mixture is brought into contact with the seeds to be treated.

One and the same tapping may be connected to several different outlets/feeds. As a variant, the number of nozzles used is the same as that of the various feeds/outlets.

The facility according to the invention allows the pulverulent substance to be introduced into the tank below the level of the aqueous medium, by means of a tapping and a negative pressure created in the tank by the vacuum source.

This method of introducing the pulverulent substance is advantageous compared, for example, with a method of introduction by means of a dip tube, in particular in the case where the pulverulent substance is a hydratable compound. The risks of fouling of the means of introducing the pulverulent substance are thus in fact limited.

Preferably, the tapping connected to the pulverulent substance feed is below the level of the aqueous medium when the latter is at rest.

The tapping connected to the pulverulent substance feed may nevertheless be above the level of the aqueous medium when the latter is at rest, when it is anticipated to stir the aqueous medium during the introduction of the pulverulent substance, the stirring causing the liquid to rise on the walls above the tapping connected to the pulverulent substance feed so that said pulverulent substance is introduced into the aqueous medium during the stirring.

The vacuum source may be a device comprising a Venturi.

The facility according to the invention may comprise at least one washing head in the tank, connected to the tank water feed pipe by means of a bypass.

The facility according to the invention may comprise a tank having a volume of less than or equal to 50 l, better still less than or equal to 20 l, even better still less than or equal to 10 l, and a volume of greater than or equal to 0.1 l, better still greater than or equal to 0.5 l, even better still greater than or equal to 1 l. The size of the tank may be set as a function of the amount of seeds to be treated per cycle and of the optional number of successive blasts of a compressed gas, set so as to totally empty said tank.

Preferably, the facility of the invention comprises conical tanks. The flow of the mixture during the emptying step is thus promoted, thereby making it possible to limit the risks of depositing the dispersion containing the pulverulent substance, in particular at the end of cycle, in particular in the case where said substance is a hydratable compound.

The facility according to the invention may comprise an automated device for controlling solenoid valves, motors and/or pumps making it possible to cyclically control the filling, including the metering, of the tank with liquid, the metering and then the injection of the pulverulent substance into the tank, the emptying of the tank, and the stirring in said tank.

The facility according to the invention may comprise two tanks for carrying out the mixing, suitable for being used in a phase-shifted manner, such that one mixture may be undergoing preparation in one of the tanks while a ready-to-use mixture is discharged from another tank.

The seed treatment device may be directly connected to the emptying outlet, in particular via a tube.

The facility may be devoid of storage zone such as a tank, for the content of the tank between the emptying and the seed treatment device.

The facility according to the invention may also be used without addition of pulverulent substance to the tank, in order to carry out a seed treatment with one or more active agents. Thus, in this case, the pulverulent substance feed tapping is not used, and the corresponding solenoid valve remains closed.

The term "seed" should not be understood with a limiting meaning.

Thus, the term "seed" denotes any organ or fragment of a plant which is placed in a growth medium (generally earth) in order to enable the formation of another plant of the same nature. It may especially be a grain. A seed may be formed from such an organ or fragment of a plant agglomerated with other substances or several organs or fragments agglomerated with one another. In addition, the seed to which the treatment process is applied may have been subjected to another treatment beforehand. In particular, this seed may have already been treated and, for example, be covered with one or more layers of a coating. Conversely, this seed may be in the natural state.

The expression "aqueous medium" denotes a medium comprising water as solvent, and the term "dispersion" denotes a heterogeneous system in which a finely divided material, in this case the pulverulent material, is distributed in another material, in this case the aqueous medium.

The term "hydratable compound" denotes a compound, for example a polymer, which, when it is dispersed in distilled water at 25° C., with agitation for 2 hours, at a concentration which may extend up to 5% by weight relative to the total weight of the dispersion, leads in less than 48 h with mild agitation, by hydration, to a formulation having a viscosity (measured at 25° C. on a Rheomat RM300 at a shear rate of 10 $s^{-1}$) of greater than 8000 cP. In this sense, the formulations for which no viscosity measurement is possible (for example in the case of totally gelled formulations) are considered to have a viscosity (measured at 25° C. on a Rheomat RM300 at a shear rate of 10 $s^{-1}$) of greater than 8000 cP.

For this measurement, the pH value of the dispersion may be adjusted in order to improve the hydration conditions of the hydratable compound. The pH value may thus typically vary from 3 to 12, especially from 5 to 10, as a function of the hydratable compound in question, the suitable pH ranges for each type of hydratable compound being known to those skilled in the art.

The hydratable compound may be present in the mixture used for treating the seeds at a maximum concentration of 70% by weight relative to the weight of the mixture. Advantageously, this concentration is between 4.5% and 70% by weight, for example between 5% and 65% by weight, better still between 7.5% and 65%, in particular between 10% and 60% by weight.

According to one embodiment, the bringing of the mixture into contact with the seeds is carried out before the viscosity of the mixture (measured at 25° C. on a Rheomat RM300 at a shear rate of 10 $s^{-1}$) reaches a maximum value. This maximum value may be greater than or equal to 10 000 cP (centipoise), i.e. 10 000 mPa·s. (millipascal·seconds), especially greater than or equal to 50 000 cP, i.e. 50 000 mPa·s. The step of bringing into contact may therefore be carried out before the viscosity of the mixture (measured at 25° C. on a Rheomat RM300 at a shear rate of 10 $s^{-1}$) reaches a maximum value of 50 000 mPa·s.

By way of illustration, the hydratable compound may especially be selected from the following compounds: a cellulose or a derivative thereof, for example hydroxycellulose, alkylcellulose, such as methylcellulose, hydroxyalkylcellulose, such as hydroxy ethylcellulose, hydroxypropylcellulose or hydroxypropylmethylcellulose, carboxyalkylcellulose, such as carboxymethylhydroxyethylcellulose, sodium carboxymethylcellulose, synthetic polymers such as polyvinylpyridine, polyvinylpyrrolidone, polyethylene glycol, polyethylene oxide, polyamide, polyacrylamide, polymethacrylic acid, polyvinyl alcohol, polyglycerol, polytetrahydrofuran, polyacrylic acid, polyacrylate, alginic acid and derivatives thereof, such as alginate, pectin, galactomannans and derivatives thereof, such as guar gum, hydroxypropyl guar gum, carboxymethyl guar, carboxymethylhydroxypropyl guar, cationic guars, gelatine, starch and derivatives thereof, such as cationic starch, corn starch, wheat starch, rice starch, potato starch, tapioca, waxy corn, sorghum, waxy sorghum, dextrin, chitin, chitosan, xanthan gum, carageenan gum, gum karaya, a derivative of any one of the abovementioned compounds, or a combination of these compounds.

According to one embodiment, the hydratable compound is selected from celluloses and derivatives thereof.

According to another embodiment, the hydratable compound is selected from galactomannans and derivatives thereof.

According to another embodiment, the hydratable compound is selected from polyacrylamides and derivatives thereof.

According to another embodiment, the hydratable compound is selected from starch and derivatives thereof.

According to another embodiment, the hydratable compound is selected from xanthan gum and derivatives thereof.

The hydratable compound is for example an agropolymer of natural origin, sold under the brand name AgRHO WR 30 or AgRHO GSB 30 by the company Solvay.

It will be noted that the mixture may advantageously comprise compounds other than the hydratable compound, such as, for example, pesticides, fungicides, herbicides, molluscicides, bactericides, bacteriostatic agents, repellant products, nutrients, fertilizers, growth stabilizers, latices (for example selected from polymers of vinyl acetate, polyurethane, styrene/butadiene or acrylic type, optionally in the form of core-shell structures), surfactants, antioxidants, plasticizers, dyes, fillers (for example a flowability powder (or siccative powder) of silica type (especially precipitated or fumed silicas), kaolin or talc), biological additives (for example bacterial or fungal (especially mycorrhizal) inoculants) or a mixture thereof. These additional compounds may be added in amounts conventionally used by those skilled in the art. By way of example, the latices may typically be introduced at contents ranging from 2 to 60 g (by solids extract), especially from 3 to 30 g (by solids extract) per quintal of seed to be treated.

The invention makes it possible to obtain a good distribution of the dispersion carried out during the mixing operation, on the seeds. This process may be used for coating of seeds, and in particular grain coating.

When the dispersion covers a seed, it has a positive influence on the growth of this seed. It appears that the dispersion makes it possible to keep the seed which it covers in a moist environment, which is favorable for the growth of the seed. This positive influence is however only observed if the concentration of hydratable compound in the dispersion is quite high, and in particular exceeds the abovementioned minimum concentration.

A high concentration of hydratable compound however has the drawback of increasing the viscosity of the dispersion. In practice, after adding the hydratable compound to the aqueous medium, the viscosity of the dispersion increases very rapidly. Bringing the hydratable compound and the seeds into contact before the viscosity of the dispersion has reached the abovementioned maximum value and/or within a certain amount of time makes it possible to limit, or even prevent, the formation of aggregates. Such aggregates are undesirable since the amount of dispersion agglutinated in aggregates cannot be used for treating seeds and constitutes a loss. Conversely, if there are little or no aggregates, a more homogeneous treatment is obtained: the dispersion is better distributed on the seeds and each seed is better covered by the dispersion. By limiting or preventing the formation of aggregates in the invention, the risk of fouling of the tank and of the mixing bowl of the seed treatment device, for example of the coating machine, in which the dispersion is mixed with the seeds, is decreased.

According to one embodiment, the weight of mixture brought into contact with the seeds may be between 0.5% and 10% of the weight of the seeds.

In some embodiments, the weight of mixture brought into contact with the seeds is greater than or equal to 0.5% of the weight of the seeds. Below this minimum value of 0.5%, the amount of mixture per seed, and hence the effect of the mixture on the seeds, may not be sufficient. Typically, the weight of mixture brought into contact with the seeds may be greater than or equal to 0.75% of the weight of the seeds, especially greater than or equal to 1% of the weight of the seeds.

Moreover, the weight of mixture brought into contact with the seeds is typically less than or equal to 10% of the weight of the seeds, especially less than or equal to 8%, in particular less than or equal to 6%. Above this maximum value, a saturation effect may be observed. In other words, the excess weight of mixture has no effect or little effect and constitutes a loss. In addition, above a ratio of 10% between the weight of the mixture and the weight of seed, especially above 8%, in particular above 6%, there is a risk of the amount of water in the mixture exceeding the acceptable threshold for the seed. Above this acceptable threshold, the seed may spontaneously germinate on storage or else quickly lose its germination capability after some time in storage.

Advantageously, carrying out the treatment process of the invention does not cause excessive hydration of the seeds. In addition, carrying out the treatment process of the invention does not modify the germination ability of the seeds.

Preferably, the hydration resulting from the application of the content of the tank on the seeds is sufficiently low for the treated seeds to be able to neither agglomerate nor germinate during their storage.

The minimum and maximum weight ratios between the weight of the mixture and the weight of seed may vary between the abovementioned ranges as a function, on the one hand, of the nature of the seed, and, on the other hand, of the formulation of the mixture, and in particular the nature of the hydratable compound.

Aside from the characteristics which have just been mentioned above, the proposed process may have one or more of the following characteristics, considered individually or according to technically feasible combinations:

When it is placed in contact with the seeds, the hydratable compound must already be at least partially hydrated. This partial hydration makes it possible to improve the adhesive capability thereof to the seed. Advantageously, the process of the invention does not require the introduction of additional adhesive solutions to ensure the adhesion of the hydratable compound to the seed.

As indicated above, the concentration of the hydratable compound is preferably between 4.5% and 70% by weight, in particular between 5% and 65% by weight, relative to the weight of the mixture. This concentration may especially be between 10 and 45% by weight, in particular between 15 and 35% by weight. These concentration ranges make it possible to obtain a good compromise, for most hydratable compounds, between the observed kinetics of viscosity increase and the amount of compound and water in the dispersion.

Optionally, a drying step may be carried out at the end of the bringing into contact of the seeds with the mixture so as to reduce the amount of water supplied by the mixture. This drying may for example be carried out by heating at a moderate temperature, for example from 20 to 40° C., for a few minutes to a few hours, so that the resulting gain in humidity by the seeds of the process of the invention does not exceed approximately 3% by weight, preferably approximately 2% by weight.

Advantageously, the process of the invention does not however comprise an additional drying step.

The seeds may be treated by batches of from 1 to 500 kg, in particular from 10 to 350 kg, in particular from 20 to 300 kg, and a treatment cycle for a batch in the seed treatment device may last less than 1 min. In addition, the process proposed may be integrated into a seed treatment line. In other words, this process may be carried out on seeds before or after other steps for treating these seeds.

The invention also relates to the treated seeds, in particular the coated seeds, obtained according to the process described above.

Figure 3:
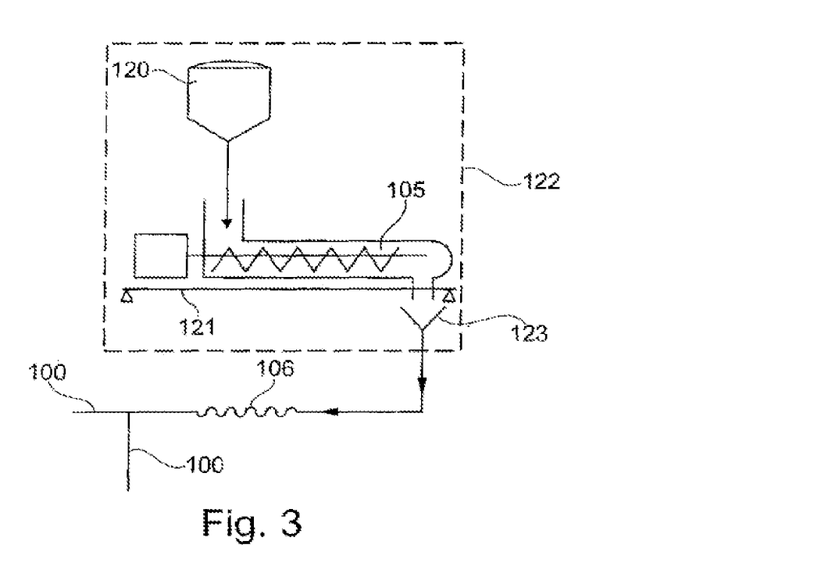
FIG. 3 shows a treatment facility according to one or more embodiments of the present disclosure.
Figure 4:
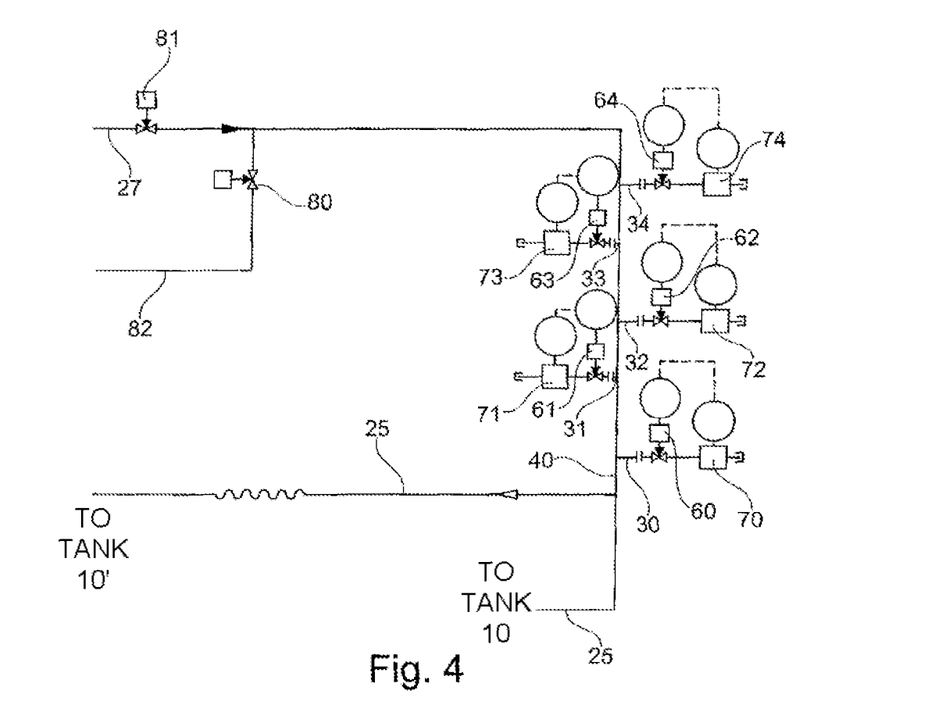
FIG. 4 shows a treatment facility according to one or more embodiments of the present disclosure.
Figure 5:
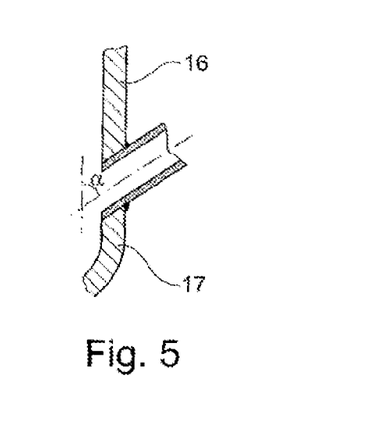
FIG. 5 represents a detailed implementation of a pulverulent substance feed tapping variant according to one or more embodiments of the present disclosure.

A nonlimiting example of implementation of the invention will now be described, with reference to the appended drawing, in which FIGS. 1 to 4 represent a treatment facility according to the invention, and FIG. 5 represents a detailed implementation of a pulverulent substance feed tapping variant.

DETAILED DESCRIPTION

The process according to the invention may be carried out using a facility as represented diagrammatically in FIGS. 1 to 4.

Figure 1:
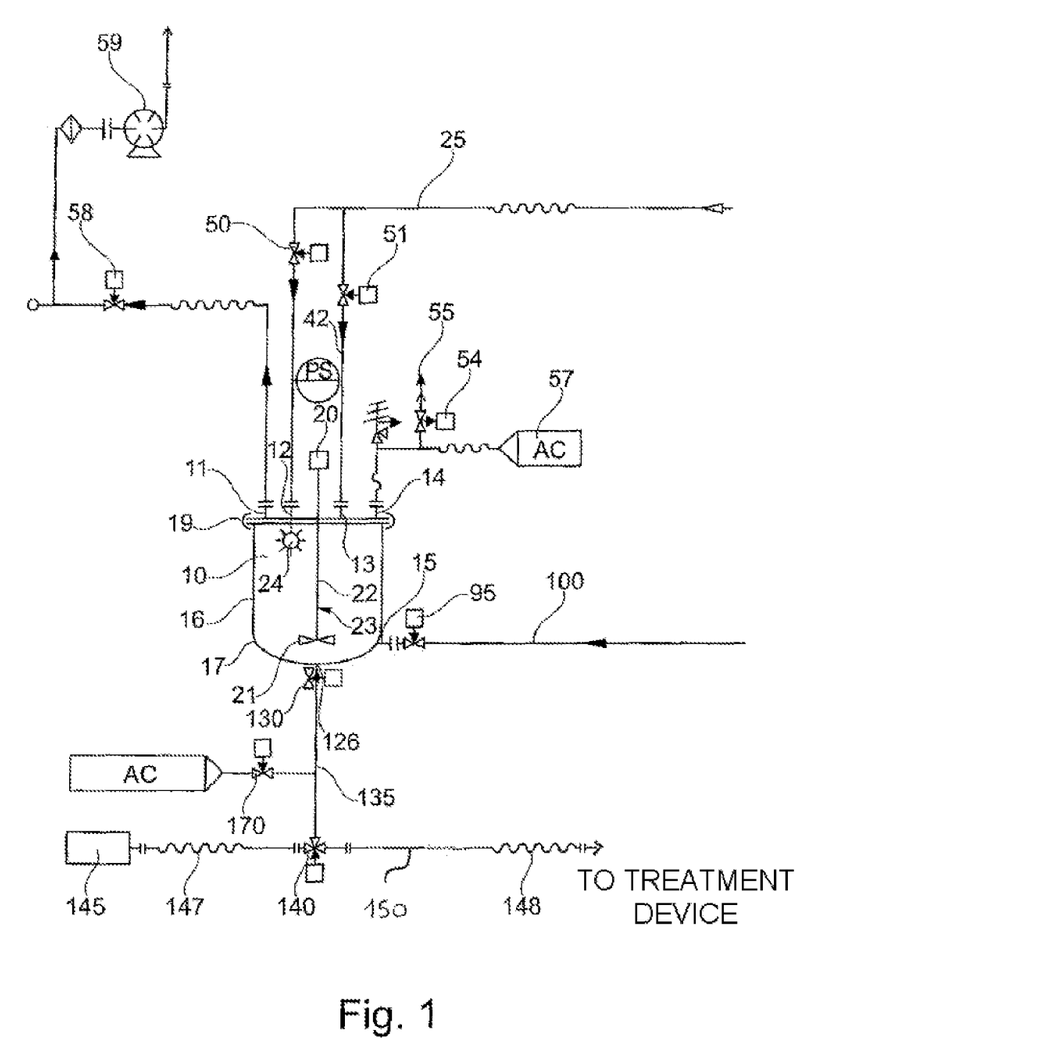
FIG. 1 shows a treatment facility according to one or more embodiments of the present disclosure.
Figure 2:
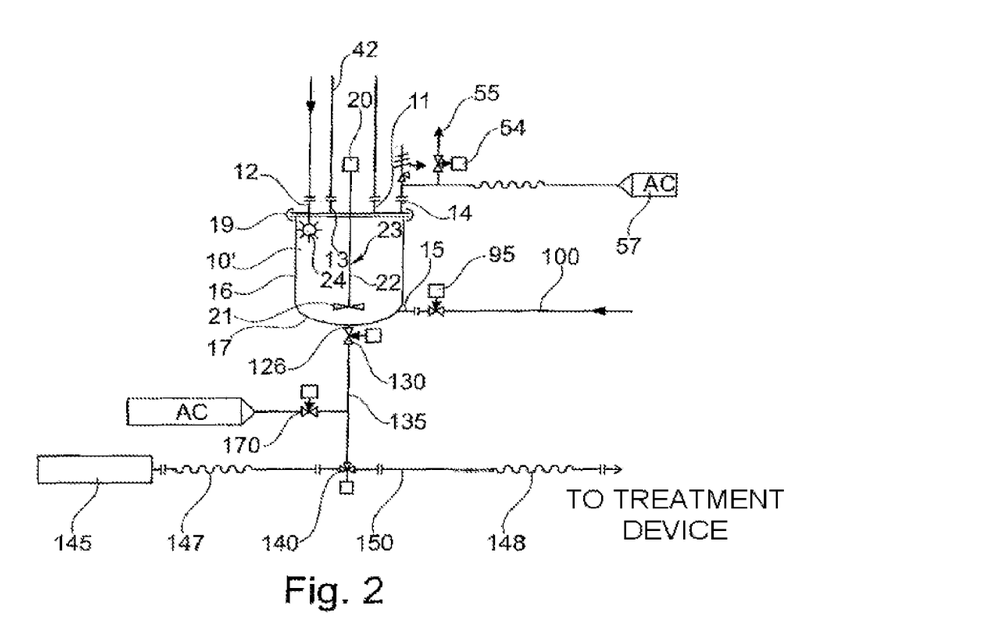
FIG. 2 shows a treatment facility according to one or more embodiments of the present disclosure.

This facility comprises at least one preparation tank 10 and, better still, as illustrated in FIGS. 1 and 2, two tanks 10 and 10'.

Each tank 10 or 10' preferably has a volume of less than or equal to 50 l, better still less than or equal to 20 l, even better still less than or equal to 10 l, and a volume of greater than or equal to 0.1 l, better still greater than or equal to 0.5 l, even better still greater than or equal to 1 l.

Each tank 10 or 10' has various tappings 11 to 14 in the upper part, and a tapping 15 on the side wall.

In the example in question, each tank 10 and 10' is for example made of stainless steel that may comprise for example an internal coating of Teflon type and comprises a cylindrical body 16 closed in the lower part by a conical bottom wall 17 and in the upper part by a cover 19.

A stirring device 23 is associated with each tank 10 and 10', this device comprising a shaft 22 which is driven to rotate on itself by a motor 20. One or more mixing members 21, which may be identical or different, are mounted on the shaft 22 in such a way as to be driven rotationally by said shaft.

The mixing member(s) 21 may be in particular selected from deflocculation devices or stirrers of Intermig type.

The tapping 12 feeds at least one nozzle for spraying rinsing water at 60-360° into the tank. In the example in question, the tapping 12 feeds a rotating pulverization ball 24.

The tapping 12 is connected, by means of a solenoid valve 50, to a pipe 25 fed by a water network 27, for example mains network, represented in FIG. 4.

As is seen in this FIG. 4, the pipes 25 connected to the tappings 12 of the two tanks 10 and 10' join together downstream of a section 40 supporting various active substance feed tappings 30 to 34, these tappings being for example placed close together according to a "clarinet" assembly.

Returning to FIGS. 1 and 2, it is seen that the tapping 13 of each tank 10 or 10' is connected, by means of a bypass 42 comprising a solenoid valve 51, to the corresponding pipe 25, upstream of the solenoid valve 50 and downstream of the section 40.

Each tapping 14 is connected, on the one hand, by means of a solenoid valve 54, to a vent 55 and, on the other hand, to a compressed air source 57, by means of a solenoid valve not represented. The tappings 11 of the tanks 10 and 10' are connected, each by means of a solenoid valve 58, to a vacuum source 59, in particular comprising a Venturi.

According to one embodiment, each tapping 14 may be connected at the same time to a vent 55 by means of a solenoid valve 54, to a compressed air source 57 by means of a solenoid valve not represented and to a vacuum source 59 in particular comprising a Venturi, by means of a solenoid valve 58. Such an embodiment makes it possible in particular to reduce the bulkiness of the facility.

The tappings 30 to 34 of the section 40 are connected, by means of respective solenoid valves 60 to 64, to sources of active agents that may be present in the final mixture.

The tappings 30 to 34 may be fed by metering pumps through respective flowmeters 70 to 74 which make it possible to accurately know the amount of active agent dispensed.

Alternatively, the flowmeters 70 to 74 are not considered to be part of the facility according to the invention, these flowmetres possibly in fact being pre-existing and linked to the metering pumps.

The section 40 may be fed selectively by a compressed air network 82 or by the mains water network 27, by means of solenoid valves 80 and 81, respectively.

Each tapping 15 opens out into the corresponding tank 10 10', below the nominal level of the liquid in the tank during the mixing operation. This means that each tapping 15 opens out into the corresponding tank 10 or 10', below the level of the liquid in the tank, taking into account where appropriate the stirring vortex. This allows the injection of the pulverulent substance below the level of liquid.

The tapping 15 opens out for example, as illustrated, substantially at the junction between the cylindrical body 16 of the tank and its bottom wall 17.

The tapping 15 may, as illustrated in FIGS. 1 and 2, be oriented substantially horizontally or, as illustrated in FIG. 5, be oriented with a non-zero angle $\alpha$ to the horizontal. The tapping 15 is for example oriented obliquely downward, in particular at 45° relative to the axis of the tank. In this case, it will preferably open out on the cylindrical body 16. The tapping 15 may also be oriented obliquely upward. In this case, it will preferably open out on the bottom wall 17. Preferably, the tapping 15 is oriented obliquely downward, in particular at 45° relative to the axis of the tank.

The tapping preferably has an internal diameter of less than or equal to 17 mm, for example of between 3 and 17 mm, better still of between 5 and 15 mm.

Each tapping 15 is connected via a solenoid valve 95 to a pipe 100 for introducing the pulverulent substance into the tank 10 or 10'. This pipe 100 is connected, as illustrated in FIG. 3, to a powder metering system 122 which includes a hopper 120 feeding a powder transfer system 105 of worm screw (for example twin screw) or vibrating plate type, all of this optionally being mounted on a weigh scale 121 in order to know, by the difference, the amount delivered.

According to one embodiment, each tank 10 or 10' may also be mounted on a weigh scale (not represented) in order to measure the amount of liquid and/or of pulverulent substance which is introduced therein.

The pipe 100 is advantageously made up, or at least one portion of its length, of a flexible hose 106, which is preferably at least partially transparent. This facilitates maintenance in the event of clogging of the pipe 100.

Compressed air may be injected into the section between the solenoid valve 95 and the powder feed container 123, by means of a solenoid valve (not represented), connected to a compressed air network (not represented), in order to flush the pipe 100 between two introductions of pulverulent substance. Compressed air may also be continuously injected into the section between the solenoid valve 95 and the corresponding tank 10 or 10', in order to limit the liquid rising up into this section.

The solenoid valve 95 preferably comprises a tap of the full-bore globe type, the outlet pipe which may be attached a short distance away on the wall of the tank so as to limit the dead volume.

In the embodiment according to which the tapping 15 is oriented substantially horizontally, as illustrated in FIGS. 1 and 2, the solenoid valve 95 may be of piston type.

The discharging of the content of each tank 10 or 10' is carried out by means of an emptying orifice 126 at the bottom point of the bottom wall 17, this orifice opening out, by means of a solenoid valve 130, onto a discharge pipe 135. The solenoid valve 130 is preferably equipped with a globe-type tap.

The pipe 135 is connected to a three-way solenoid valve 140, which makes it possible to selectively connect the pipe 135 either to a waste collection container 145, or to a pipe 150 for feeding a training device, such as a coating machine, not represented on the drawing. Preferably, as illustrated, the connection of the solenoid valve 140 to the container 145 and to the treatment device is carried out by means of flexible hoses 147 and 148, respectively, advantageously made of stainless steel braided PTFE, which facilitates discharging the dispersion. An anti-drop valve (not represented) may be installed at the end of the flexible hose 148.

The three-way solenoid valve 140 is preferably equipped with a globe-type tap.

A nonintrusive flowmeter (not represented) may be placed downstream of the three-way solenoid valve 140 (that is to say between the seed treatment device and the three-way solenoid valve 140) for controlling said valve in order to interrupt the emptying of the corresponding tank 10 or 10' at the end of each cycle of feeding the treatment device by means of one of the tanks. The flowmeter makes it possible to know the amount of mixture sent to the treatment device. This nonintrusive flowmeter is not required when the content of the tank is totally emptied by means of a single blast of a compressed gas.

Compressed air may be injected into the section between the solenoid valves 130 and 140 by means of a solenoid valve 170, connected to the compressed air network, in order to flush the pipes at the end of use.

The shaft 22 of the stirring device may be centered or off-center relative to the axis of the tank.

The facility operates in the following way. The various solenoid valves, pumps and motors are controlled by an automated device. The latter automated device receives information from various sensors of the facility, in particular pressure, flow and weight sensors.

The tanks 10 and 10' are preferably used in parallel, in a phase-shifted manner, with preparation, in parallel, of the mixture in one of the tanks while the mixture contained in the other tank is sent to the treatment device, and conversely. In the following text, the process is described for the tank 10 only, since it is the same for the tank 10' in a time-shifted manner.

The tank 10 is first fed with active agents by the tapping 13, then with water by the tapping 12, and the level of liquid in the tank corresponds to a predefined amount which depends on the final concentration to be obtained of pulverulent material in the mixture. This level of liquid is sufficient for the tapping 15 to be immersed, where appropriate taking into account the stirring vortex. The volume of the mixture is preferably less than or equal to 15 l, better still less than or equal to 10 l. During the filling, the solenoid valve 54 is open, in order to open the communication to the vent 55. The water feed via the washing head 24 makes it possible to clean away from the emerging portion of the tank, any deposits left by the previous preparation cycle.

Then, the solenoid valves 50, 51 and 54 being closed, the solenoid valve 58 is opened, so as to place the tank under negative pressure via the tapping 11. Once the sufficient level of negative pressure has been reached, the solenoid valve 95 is opened so as to allow the injection of at least one pulverulent substance previously weighed and stored in the powder feed tank 123 below the level of liquid, where appropriate taking into account the vortex from stirring the latter during the injection. The minimum level of negative pressure in the tank just before the suctioning of the pulverulent substance is preferably between −0.05 and −1 bar, in particular between −1 and −0.8 bar, better still between −0.3 and −0.5 bar. Such a level of negative pressure allows satisfactory suctioning of the pulverulent substance while at the same time preventing the latter from being suctioned too violently and from passing through the liquid to the cover, which would cause foul of the emerging walls and the emission of dust. During the injection of pulverulent substance, the negative pressure is maintained at a sufficient value. The mixture is then subjected to stirring according to a first condition.

Next, the solenoid valves 58 and 95 are closed, and the mixture is subjected to a second stirring condition. This second condition is stronger, typically by a factor of 1.1 to 4, than the first. This second condition may be prolonged until the beginning of the emptying of the tank 10.

Once the mixture is ready to be sent to the seed treatment device, which is for example a coating machine, compressed air is sent via the tapping 14 and then the solenoid valve 130 is opened.

Once the anticipated amount has been delivered, the solenoid valve 130 is closed.

The mixture may be subjected, during the discharging of the tank 10, to stirring according to a third condition which is weaker, typically by a factor of 0.05 to 0.9 (or even zero), than the second.

The total emptying of the content of the tank may be carried out either by means of a single blast of a compressed gas, or by means of several consecutive blasts of a compressed gas. Preferably, the total emptying of the contents of the tank is carried out by means of a single blast of a compressed gas.

The discharging of the content of the tank may thus be carried out batchwise, in order to avoid too great an afflux of mixture to the treatment device. In this case, the solenoid valve 130 is opened at intervals.

The first blast may be carried out at the latest 60 s after the end of the introduction of the pulverulent substance into the tank, better still at the latest 30 s after said introduction, and the final blast may be carried out, where appropriate, at the latest 30 min after the end of the introduction of the pulverulent substance into the tank, better still at the latest 15 min after said introduction, even better still at the latest 5 min after said introduction and even better still at the latest 75 s after said introduction, or even at the latest 60 s after said introduction.

The level of overpressure in the tank 10 during the at least partial emptying operation is preferably between 0.05 and 2 bar, in particular between 0.1 and 1 bar. For example, the level of overpressure in the tank during the at least partial emptying operation may be less than or equal to 0.5 bar, for example between 0.1 and 0.5 bar.

When the emptying of the tank is fractionated, that is to say when it is carried out by several consecutive blasts of a compressed gas, the volumes emptied out during each blast may be identical or different. These volumes are determined according to the amount of seeds to be treated.

Once the tank 10 has been substantially emptied, the next preparation cycle may be started, while the mixture prepared in the tank 10' may be sent to the seed treatment device.

Of course, the invention is not limited to the example which has just been described.

The facility may comprise just one preparation tank, or, as a variant, more than two tanks.

The facility may also be used, where appropriate, for preparing a mixture without pulverulent substance, by introducing one or more active agents via the tappings 30 to 34, and by optionally mixing them with water sent to the tank 10 or 10'.

Several powder metering systems may be used to feed the tank with different pulverulent substances. Thus, the mixture may comprise different pulverulent substances.

The invention claimed is:

1. A seed treatment process, using a composition obtained extemporaneously by mixing at least one pulverulent substance and an aqueous medium, comprising the steps consisting in:
   automatically and cyclically carrying out the mixing in at least a first tank by introducing into said tank first at least one portion of the aqueous medium and then the pulverulent substance, the latter being sucked into the aqueous medium in the tank by virtue of a negative pressure created in the tank,
   at least partially emptying its content to a seed treatment device where the mixture is brought into contact with the seeds, said emptying being carried out by means of at least one blast of a compressed gas in the tank.

2. The process as claimed in claim 1, wherein the pulverulent substance is a hydratable compound.

3. The process as claimed in claim 1, wherein the volume of the mixture in the tank is less than or equal to 15 l.

4. The process as claimed in claim 1, wherein at least one blast includes a first blast and a final blast, wherein the first blast is carried out at the latest 60 s after the end of the introduction of the pulverulent substance into the tank and the final blast is carried out at the latest 30 min after the end of the introduction of the pulverulent substance into the tank.

5. The process as claimed in claim 1 wherein the introduction of the pulverulent substance into the tank is carried out through a tapping with an internal diameter of less than or equal to 17 mm.

6. The process as claimed in claim 5, wherein the mixture is subjected to stirring according to a condition that is weaker at the time of the at least partial emptying, compared with the sequence going from the beginning of the introduction of the pulverulent substance to the beginning of the emptying,
   wherein the condition is a rotational stirring rpm (revolution per minute).

7. The process as claimed in claim 1, wherein a minimum level of negative pressure in the tank just before the suctioning of the pulverulent substance is between −0.05 and −1 bar.

8. The process as claimed in claim 7, wherein the minimum level of negative pressure is maintained in the tank throughout the introduction of the pulverulent substance.

9. The process as claimed in claim 1, wherein a level of overpressure in the tank during the at least partial emptying operation is between 0.05 and 2 bar.

10. The process as claimed in claim 1, wherein a discharging of the content of the tank is carried out at the latest 5 min after the end of the introduction of the pulverulent substance into the tank.

11. The process as claimed in claim 1, wherein a hydration resulting from the application of the content of the tank on the seeds does not allow for the treated seeds to either agglomerate or germinate during their storage.

12. The process of claim 1, wherein the tank is in fluidic communication with and upstream of the seed treatment device.

13. The process of claim 1, wherein the first tank and the seed treatment device are connected.

14. The process of claim 1, wherein the seed treatment device is directly connected to an emptying outlet on the tank.

* * * * *